United States Patent

[11] 3,588,121

[72] Inventors Gerald H. Freier; Charles E. Zanders, Benton Harbor, Mich.
[21] Appl. No. 873,593
[22] Filed Nov. 3, 1969
[45] Patented June 28, 1971
[73] Assignee V-M Corporation Benton Harbor, Mich.

[54] RECORD CHANGER SPINDLE
9 Claims, 5 Drawing Figs.

[52] U.S. Cl. ........ 274/10
[51] Int. Cl. ........ G11b 17/04
[50] Field of Search ........ 274/10 (S), 10

[56] References Cited

UNITED STATES PATENTS 3,336,032 8/1967 Hammond .......... 274/10

*Primary Examiner*—Leonard Forman
*Assistant Examiner*—Steven L. Stephan
*Attorney*—Johnson, Dienner, Emrich, Verbeck & Wagner

ABSTRACT: Record-supporting fingers ride in vertical slots in the center spindle of a record changer between an upper storage position and a lower playing position on the turntable. These supporting fingers are pivotally mounted on a carriage which is slidably disposed within the hollow bore of the center spindle and is actuated by an elongated flexible tape having one end secured to the lower end of the carriage and its opposite end coupled to the free end of a horizontally operating arm. The flexible tape is guided in a trackway having vertical and horizontal portions interconnected by a curved channel portion at the base of the center spindle, the flexible tape moving therethrough freely to positively raise and lower the carriage in response to horizontal movement of the arm.

Inventors.
Gerald H. Freier, &
Charles E. Zanders.
By Johnson, Dienner, Emrich, Verbeck & Wagner
Att'ys.

Inventors.
Gerald H. Freier, G.
Charles E. Zanders.
By: Johnson, Dienner, Emrich, Verbeck & Wagner
Attys.

Inventors.
Gerald H. Freier &
Charles E. Zanders
By Johnson, Dienner, Emrich, Verbeck & Wagner Attys.

RECORD CHANGER SPINDLE

A principal object of the invention is to provide an economical, readily manufacturable and simplified mechanism for operating the center spindle of a record changer or phonograph that lowers phonograph records to the turntable in controlled fashion.

It is known to support a stack of records in an upper storage portion of the spindle over the turntable during record play and then to lower the bottom record of said stack on fingers which project through provided vertically extending slots in the spindle and do not release their support of the record until the fingers have carried the record to the playing surface of the turntable or surface of a previously lowered record, at which time the fingers are withdrawn into the interior of the spindle below the turntable surface. However, such an arrangement requires that the actuating mechanism move through a correspondingly long stroke below the turntable. To accommodate this long vertical stroke, the vertical dimension of the space below the turntable is usually increased beyond that which would otherwise be needed to contain the other components of the phonograph.

One proposal to permit a more compact arrangement of the changer components below the turntable has been to actuate the raising and lowering of the record supporting fingers along the length of the spindle by using a train of disconnected balls which extend vertically within the spindle body to a height where they support the finger supporting carriage and are movable downwardly therefrom under the force of gravity into a horizontal track which communicates with the lower end of the spindle and can be located in parallel relation to the turntable. In this horizontal track the last ball of the train is engaged by a horizontally operating bellcrank lever, the train of balls thus translating horizontal movement of the bellcrank lever into vertical movement of the record supporting fingers.

Although this structure has been successfully used commercially, it sometimes presents manufacturing and/or assembly problems because of close tolerances which must be observed in relating the size of the balls to the dimensions of the track. If the internal diameter of the spindle is slightly oversize, or the balls are undersize, or if minor obstructions such as dirt is present, it is possible for the balls to misalign or jam, impairing the raising and lowering operation. A certain amount of noise also accompanies movement of the train of balls during the change cycle.

Accordingly, it is an important object of the invention to provide a record lowering mechanism which is simple yet compact in construction and dependable in performance.

Another object of the invention is to provide an actuating mechanism for raising and lowering the record supporting fingers which is quieter in operation than prior art devices of this type.

In accordance with the invention, these objects are achieved and the mentioned disadvantages of the prior art overcome by utilizing an elongated flexible element which has one end affixed to the finger supporting carriage and its other end coupled to the horizontally moving arm of the change cycle actuating mechanism. This elongated element being flexible can be guided in a required nonlinear path and to drive the record-supporting fingers in both the raising and lowering directions within the spindle in response to the horizontal movement of the operating arm as it is actuated by the record changing mechanism. The side edges of the flexible element can be slidably seated in oppositely located shallow grooves provided in the interior wall of the spindle and caused to move through a curved restricted passageway into a horizontal guide member disposed below the spindle which is at a sharp angle to the vertical axis of the spindle. This guide member can be located horizontal or parallel to the turntable and immediately adjacent the mounting plate which supports the turntable. However, it also can be disposed at any other angle to the vertical spindle. The elongated flexible member by reason of its guidance does not buckle under the load of a record or records supported on the fingers and can be used either in compression or tension to "push" the carrier up to the record supporting position and "pull" the carrier down to the bottom of the spindle below the turntable surface.

Retraction of the fingers into the interior of the spindle as they engage the centerhole edge of the turntable or a previously lowered record is therefore positive and not dependent on gravity or the weight of the lowered record on the fingers; and a strong finger return spring may be utilized to back up the fingers. This will permit the fingers protruding further from the spindle body for greater stabilization of off-balance records both during the lowering and in the storage position. This represents a further and important feature or advantage of the invention.

Still other objects, advantages and features of the invention will become apparent as the specification proceeds and the features of novelty which characterize the invention will be pointed out with particularity in the claims annexed hereto below and forming a part of this patent specification.

For a better understanding of the invention, reference may be had to the accompanying drawings in which a preferred embodiment of the invention is illustrated.

In said drawings:

FIG. 1 is an elevational view, partly in section and partly broken away, of a center spindle record changer provided with actuating mechanism and constructed in accordance with the present invention, the record-supporting fingers being shown in their normal position to support a stack of records on an upper storage portion of the spindle, the supporting fingers also being shown by dash lines in a partially lowered position as the record to be played is being lowered by the fingers to the turntable;

Figure 1:
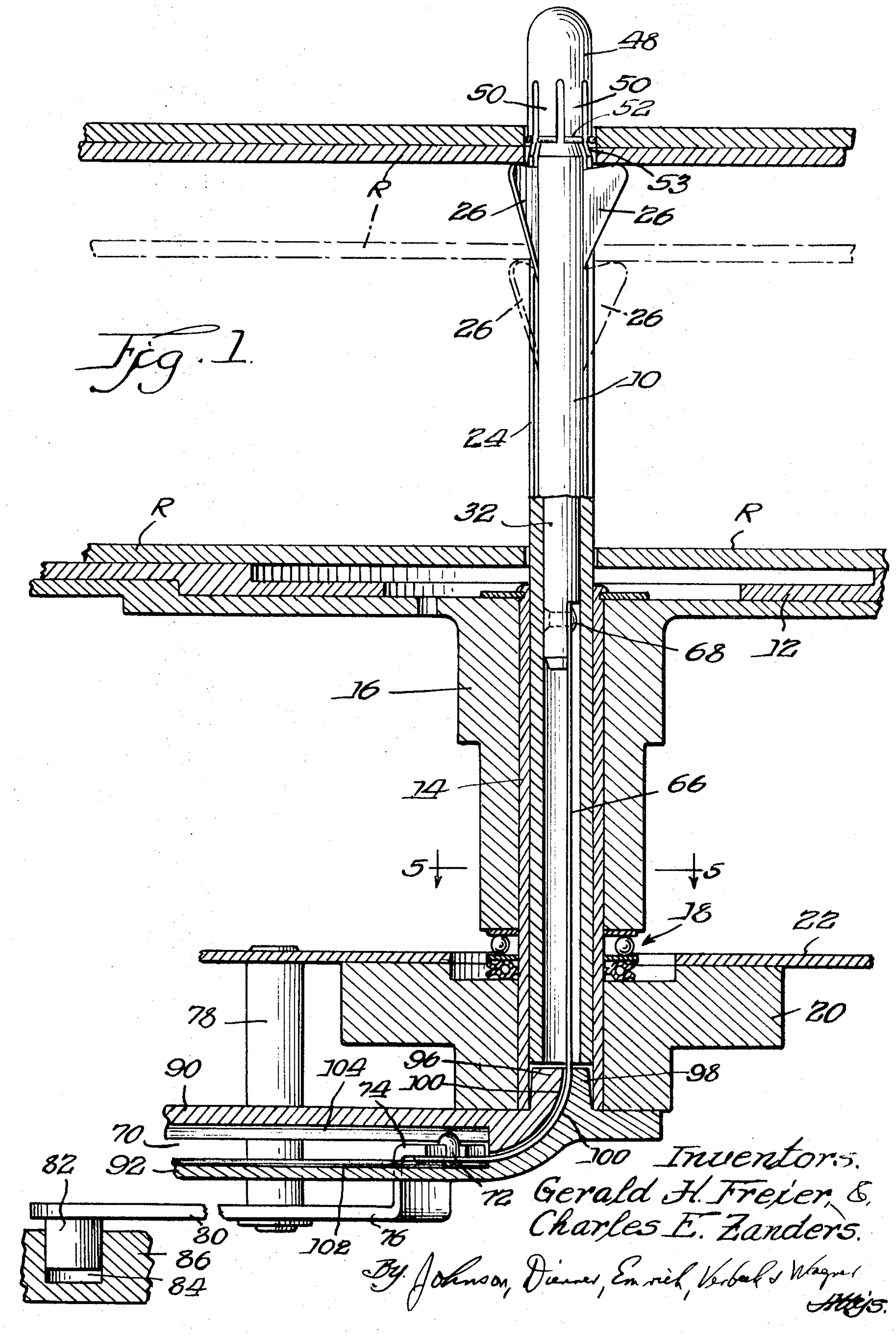
Figures 3, 4, 5:
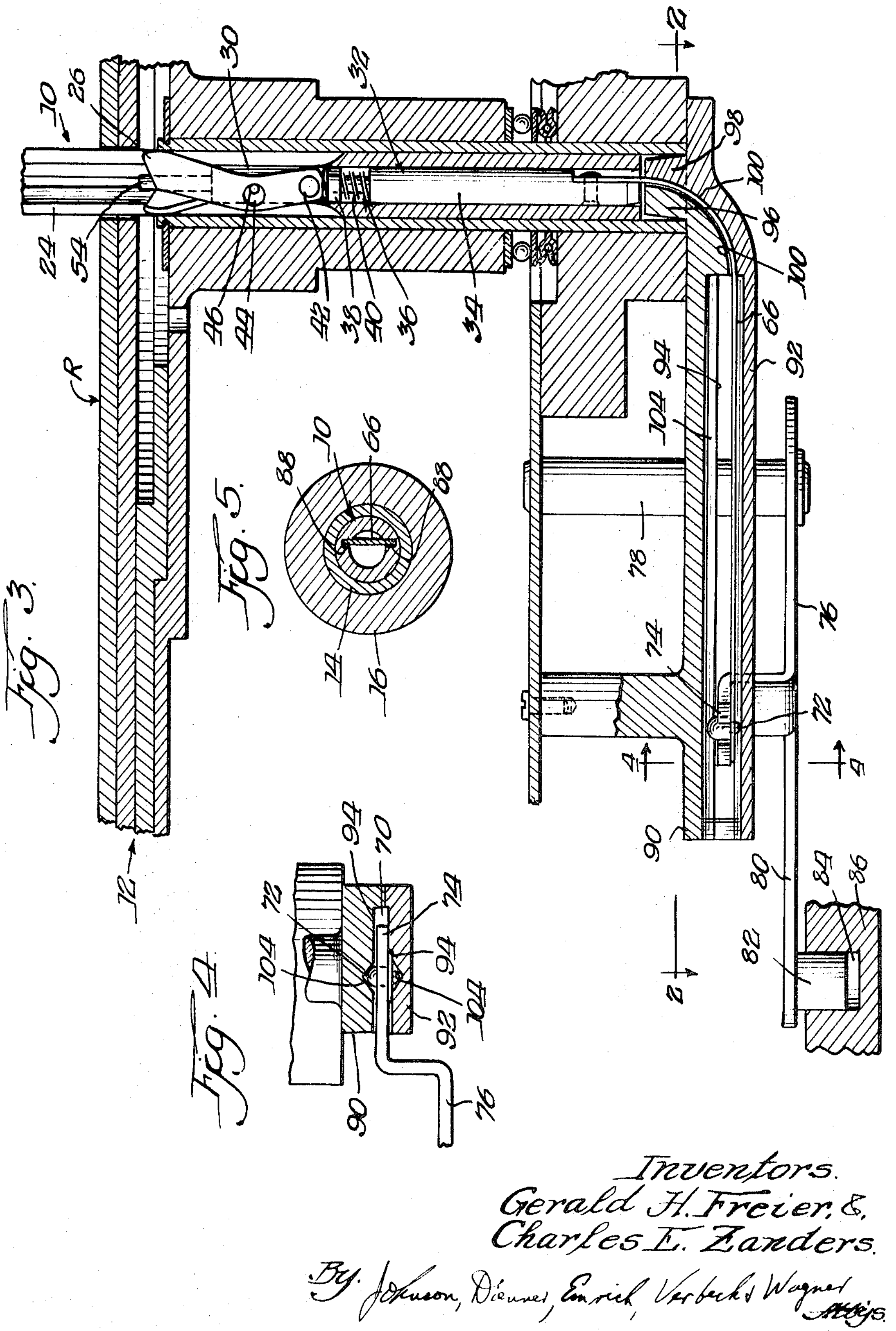
FIG. 3 is a fragmentary vertical sectional view showing the record-supporting fingers at the lower end of the stroke and retracted within the spindle body to release a record to the turntable for playing.
FIG. 4 is a fragmentary sectional view taken substantially along line 4—4 of FIG. 3.
FIG. 5 is a sectional view taken substantially along line 5–5 of FIG. 1.

Referring now more particularly to the several views of the drawing wherein like parts are identified by like reference numerals, and first to FIG. 1, at 10 is a record changer spindle disposed centrally of a turntable 12, said spindle having its lower end secured within bearing sleeve 14 about which integral sleeve 16 of the turntable 12 is rotatably mounted. At 18 is a thrust bearing which vertically supports the turntable sleeve 16. Said thrust bearing 18 is supported on mount 20 which is secured to the underside of the record changer mounting plate 22. Spindle 10 is provided with a plurality of vertical slots 24 through which extend record supporting fingers 26 in order to support a stack of records R on an upper storage portion of the spindle 10. Slots 24 extend vertically from said upper storage portion to approximately at or below the record-supporting surface of the turntable 12. The number of fingers may vary and will preferably comprise at least three in number. FIG. 3 shows three such fingers 26 each pivotally mounted on a respective flat side surface of an upper triangular portion 30 of finger carrier assembly 32, the carrier 32 being slidable within the spindle 10. Finger carrier 32 also includes a lower cylindrical portion 34 integrally connected to the upper portion 30 by reduced diameter rod portion 36 about which collar 38 is vertically slidable. Collar 38 is yieldingly urged upwardly by a compression spring 40 which surrounds the reduced diameter rod portion 36 and is disposed beneath collar 38. As illustrated in FIG. 3, each of the supporting fingers 26 has its lower end pivotally mounted at 42 and includes an opening 44 spaced thereabove into which projects a stud 46 which serves as a stop to limit the outward pivotal movement of the supporting fingers 26. The supporting fingers 26 are therefore yieldingly urged toward their outermost pivotal positions as illustrated in FIG. 1 by slidable collar 38 as it is biased upwardly against the lower end of the fingers by spring 40. Carrier 32 is slidable within the spindle 10 to a position below the surface of the turntable 12, which will permit fingers 26 while retained in their outwardly extended position to carry the bottom record of the stack from the upper storage position on the spindle to the upper surface of the turntable 12 or record previously lowered thereto, the fingers 26 being free to pivot on their connection 42 into the interior of the spindle as the fingers engage on the inner edge of the turntable sleeve 16 or the centerhole edge of the record previously lowered to the turntable.

FIG. 1 shows secondary record-supporting means actuatable to support the remaining records of the stack in the upper storage position of the spindle 10 during the interval that fingers 26 lower the bottom record of the stack to the turntable. Said secondary record-supporting means are illustrated as comprising a cap 48 having its lower end divided into a plurality of downwardly extending fingers generally designated by 50. Each of these depending fingers 50 has a flange or enlarged portion 52 normally located adjacent the periphery of the centerhole of the next-to-lowermost record in a stack of records R supported on the upper storage portion of the spindle 10 by fingers 26. Cap 48 is vertically moved between an upper inoperative position wherein its fingers 50 are retracted with their enlarged lower ends 52 spaced inwardly of the centerhole edge of the next-to-lowermost record and a lower operative position wherein the fingers are expanded outwardly on an inclined surface portion 53 of the spindle to grip the next-to-lowermost record in the stack. Cap 48 is biased downwardly by a spring not shown and is moved upward against the biasing of said spring by an upward extending rod 54 fixed to the finger carrier 32. Any other suitable secondary record-supporting means may be utilized for supporting all but the lowermost record in the stack when the latter record is being lowered to the turntable for playing.

The record lowering spindle as thus far described is conventional in its construction. However, in accordance with this invention, a novel actuating mechanism is utilized which positively moves the carriage 32 and its record supporting fingers 26 between their upper storage position on the spindle and a retracted position within the interior of the spindle 10 below the turntable 12. As shown in FIG. 1, such mechanism comprises an elongate flexible member or tape 66 having its upper end pinned or otherwise affixed as at 68 to the lower end of the carriage 32. Said tape member 66 extends downwardly therefrom through the hollow of the spindle 10 into a horizontally disposed track indicated generally at 70. In the opposite end of said tape 66 is a pin 72 having a protruding shank about which the bifurcated or slotted outer end 74 of an arm 76 of a pivotally mounted bellcrank lever 78 is pivotally and slidably coupled. Said bellcrank lever has a second arm 80 which supports a roller 82 at its outer end following in a track 84 of a cam 86 rotatably mounted on the underside of the mounting plate 22.

Considering now FIG. 5 with FIG. 1, the flexible tape 66 is guided in a vertical path within the spindle 10, by diametrically or oppositely disposed vertically extending shallow grooves 88 provided in the inner wall of the body comprising the spindle 10. Horizontal track 70 is formed by upper and lower guide plates 90 and 92 which are united together in suitable manner as by bolts (not shown).

Figure 2:
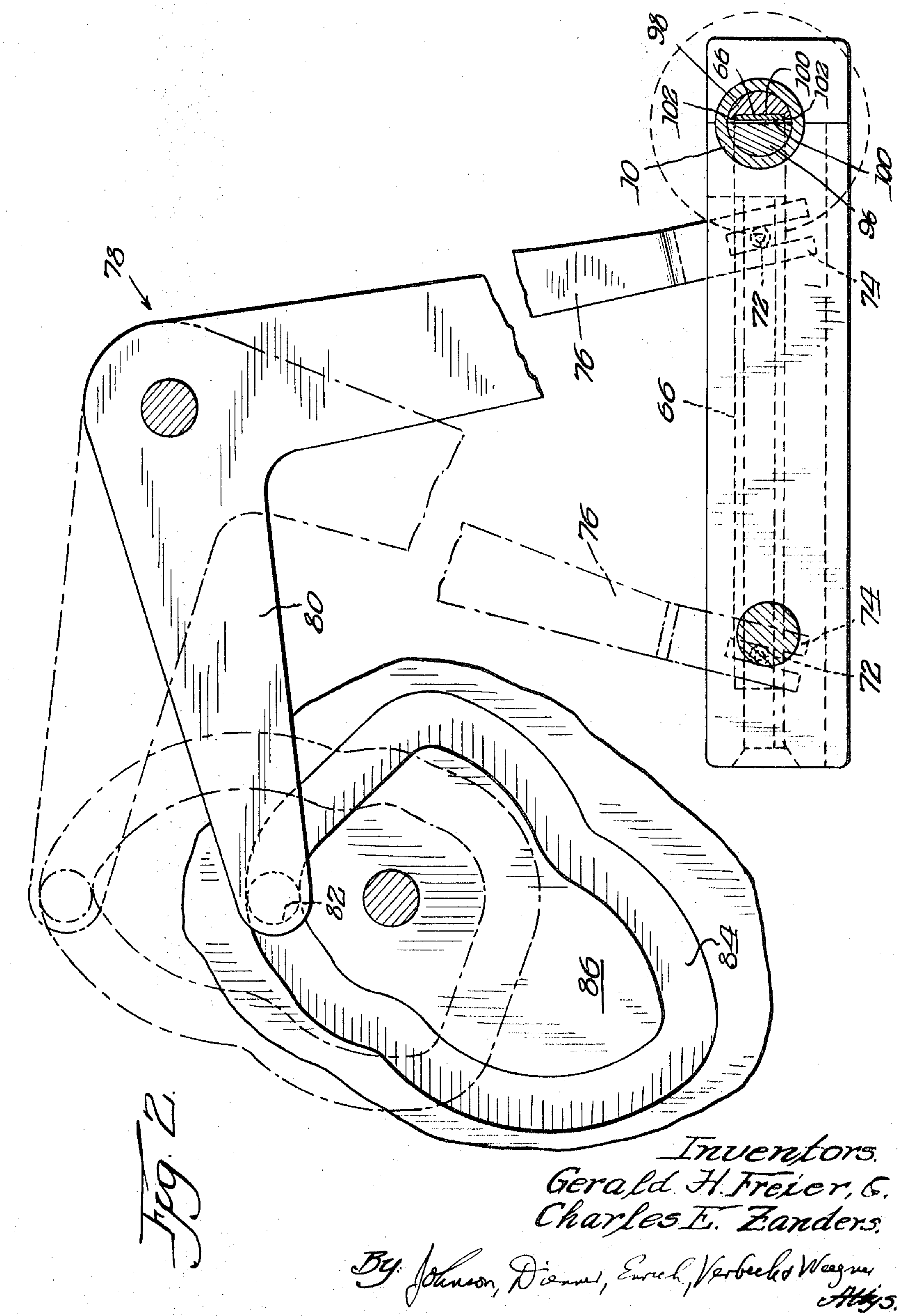
FIG. 2 is a horizontal sectional view, partly broken away, and taken substantially along line 2—2 of FIG. 3, and shows a cam and bellcrank arrangement for producing horizontal movement of an elongated flexible element which is translated into vertical movement of the record-supporting fingers.

As illustrated in FIG. 3, the two guide plates 90 and 92 have spaced facing surfaces 94 between which tape 66 is sandwiched. Said guide plates also have complementing semicylindrical portion 96,98 at one end which seat within the lower open end of the spindle 10. Said upstanding portions 96,98 have spaced radiused interior surfaces 100 and opposed inner surfaces 102 providing a rectangular passageway which aligns with grooves 88 and the space between the surfaces 94 to direct or guide the tape in its passage from horizontal track 70 into grooves 88. The space between surfaces 94 is open, at least along one side thereof and through which the bifurcated end 74 of the actuating lever 76 is reciprocal lengthwise in slot 70. As illustrated in FIGS. 2 and 3, the facing inner surfaces 94 of the two guide plates which define the horizontal track 70 also have parallel directed grooves 104 for the head and end of pin 72 to which the bifurcated end 74 of the lever 76 is coupled. Grooves 104 are preferably V-shaped and the two grooves effectively guide pins 72 and thereby tape 66 in a linear path longitudinally of the horizontal track portion 70 between surfaces 94 as the bellcrank 78 is pivoted by cam 86.

Tape 66 may be of any flexible material that will withstand tensile or compressive loading under the weight of the record stack without changing length. Excellent results have been achieved using 0.005 inch "blue clock" pretempered spring steel. Spring brass of similar thickness may also be used. Although thicker and therefore less flexible metal tapes may be used, such is usually not necessary since grooves 88 confine the vertically moving portion of tape 66 within the spindle against lateral displacement and buckling, while facing surfaces 94 of the guide plates 90 and 92 are closely spaced to permit free sliding movement of the lower portion of the tape but inhibit buckling thereof as it moves horizontally with actuation of lever 76. Grooves 104 direct the tape movement longitudinally of horizontal space or track 70, and surfaces 100 and 102 of the interconnecting arcuate track guide the tape between the grooves 88 and space 70 without an abrupt change so that the tape moves freely under the actuation of lever 76 whether under compression or under tension.

Referring therefore to FIG. 2, cam 86 is rotated through one revolution during each record change cycle, that is each time a new record R is to be lowered to the turntable for playing. Any suitable mechanism may be provided for intermittently rotating the cam 86. In one known record changer a drive mechanism includes a large diametered drive gear which is rotated one revolution during each record change cycle to effect various operations incident to the lowering of the new record to the turntable. If desired cam 86 may be mounted from such a large-diametered drive gear for rotation therewith.

During each record change cycle the cam 86 is rotated one revolution and cam track 84 acts on roller 82 to pivot arm 76 of the bellcrank lever 78 from the position shown in solid lines in FIG. 2 to the position shown in dash lines therein and then back again to its original position. As the bellcrank lever pivots, its end 74 moves initially to the left as viewed in FIG. 1 until it reaches its extreme position as shown in FIG. 3. During such movement, arm 76 pulls the flexible element or tape 66 downwardly and to the left through the horizontal space or track 70 between surfaces 94 of guide plates 90 and 92. As the flexible element is pulled to the position shown in FIG. 3, finger carrier 32 and its supporting fingers 26 are positively moved downwardly carrying the bottom record R of the stack on fingers 26 to the turntable !12. The remainder of the record stack is supported by the outwardly cammed depending fingers 50 of the cap 48. As the supporting fingers 26 reach the level of the turntable 12 they are cammed inwardly on the edge of the turntable bearing sleeve 16 or centerhole of the previously lowered record into the retracted position illustrated in FIG. 1 within the interior of the spindle 10 and release the record onto the turntable surface for playing. Further rotation of the cam 86 through its single revolution causes the bellcrank to be returned to the position shown in solid lines in FIG. 2 and pushing the flexible element 66 back up into the vertical track portion defined by the grooves 88 and thereby returning the carriage 32 and its supporting fingers 26 to the position of FIG. 1. As the fingers 26 return to the position of FIG. 1, cap 48 is raised slightly to retract its depending fingers 50, releasing the record stack to the supporting fingers 26. It will thus be appreciated that since retraction of fingers 26 within spindle 10 is directly responsive to the force or pull exerted by cam 84 or bellcrank 78 on carriage 32 by means of the flexible element 66 it is possible to use a relatively strong spring 40 to hold fingers 26 in their extended position.

Thus having described my invention:

We claim:

1. In a record changer a spindle having retractable record support fingers mounted on a carriage vertically reciprocable within said spindle, an actuator therefor comprising an elongate flexible member having one end connected to said carriage and extending downwardly therefrom, guide means in said changer constituting a generally horizontal track one end of which is curved to communicate with the lower end of the spindle in which the flexible member is received and guided, means for maintaining that portion of the flexible member which is within the spindle straight, and a horizontally movable arm connected to the other end of the elongate flexible member which pushes and pulls on the flexible member, said flexible member being sufficiently stiff to follow in said track and thereby push as well as pull said carriage connected thereto in order to effect lowering and raising of the carriage in the spindle with horizontal movement of said arm.

2. In a record changer a spindle as claimed in claim 1, the spindle having means therein in which the means for maintaining the flexible member straight receive and confine the elongate flexible member for vertical movement.

3. In a record changer a spindle as claimed in claim 1, the elongate flexible member being tapelike and the means for maintaining the flexible member straight slidably receive the opposed side edges of said flexible tapelike member and confine the member against buckling under the weight of a record supported by the fingers mounted on said carriage.

4. In a record changer a spindle as claimed in claim 1, wherein the guide means include a slot in the sidewall thereof lengthwise of the horizontal track, through which the operating arm is horizontally reciprocable to push and pull the flexible member.

5. In a record player having a turntable and an upstanding center spindle with a bore formed therein along its length, said spindle having peripherally spaced slots vertically extending from adjacent its upper end portion to adjacent the surface of said turntable, a plurality of fingers projecting from said slots to support a record, finger carriage means disposed within said bore to lower a record supported by said fingers from an upper storage position on the spindle to a playing position on the turntable, the improvement comprising an actuating mechanism for raising and lowering said carriage means including track means having a vertical portion within the bore of said spindle and a communicating horizontal portion beneath the turntable generally parallel to said turntable, and an elongated flexible element adapted to ride in said track means having one end secured to said carriage means and its opposite end coupled to means operative during a record change cycle for moving said flexible element in the horizontal portion of said track means to push and pull said flexible element, said flexible element being sufficiently stiff to follow in said track means and push as well as pull said carriage means secured thereto and thereby positively control vertical movement of said carriage means within said bore in both directions.

6. The improvement in record player as defined in claim 5, wherein said track means of the actuating mechanism includes a narrow curved channel interconnecting said horizontal and vertical portions through which said flexible element is pushed and pulled by said means coupled to its opposite end.

7. The improvement in a record player as defined in claim 5, wherein said flexible element of the actuating mechanism is a tapelike spring member of pretempered steel.

8. The improvement in a record player as defined in claim 5 wherein said operative means of the actuating mechanism includes a pivotally mounted arm having a free end adapted to swing between two horizontal limits within the horizontal portion of the track means during a record change cycle, said free end having a two prong fork configuration and a pin member secured to said opposite end of said flexible element which is adapted to ride between said prongs as said free end swings between said two horizontal limits.

9. The improvement in a record player as defined in claim 8 wherein said horizontal portion of the track means of the actuating mechanism has a V-groove along its length which guides said pin member secured to said opposite end of said flexible element in a straight line horizontal path, the flexible element translating said movement of the pin into vertical movement of the carriage means.

PO-1050
(5/69)

UNITED STATES PATENT OFFICE
CERTIFICATE OF CORRECTION

Patent No. 3,588,121 Dated June 28, 1971

Inventor(s) Gerald H. Freier and Charles E. Zanders Case 1

It is certified that error appears in the above-identified patent and that said Letters Patent are hereby corrected as shown below:

Column 5, line 21, delete

"the spindle having means therein"

Signed and sealed this 14th day of December 1971.

(SEAL)
Attest:

EDWARD M.FLETCHER,JR.
Attesting Officer

ROBERT GOTTSCHALK
Acting Commissioner of Patents